J. T. BLACK & J. TRUAX.
Meat-Pounder.
No. 166,332. Patented Aug. 3, 1875.
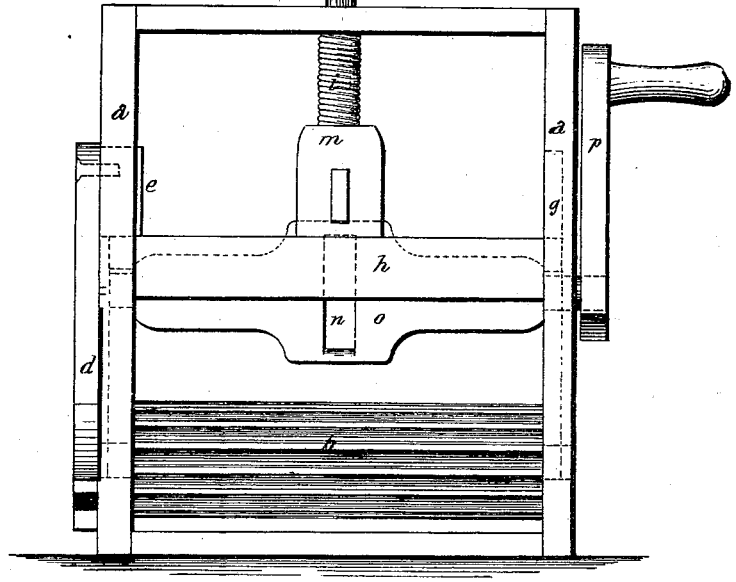
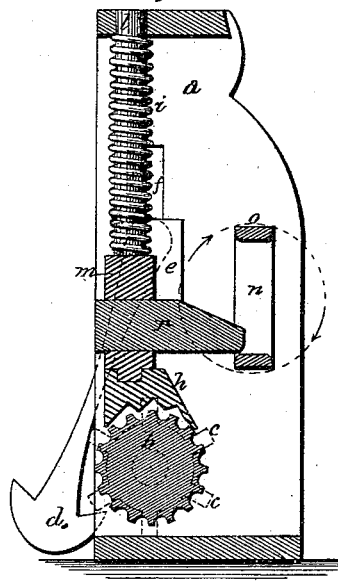
WITNESSES
INVENTOR
Jas. T. Black
Job Truax
per F. A. Lehmann
Atty

UNITED STATES PATENT OFFICE.

JAMES T. BLACK AND JOB TRUAX, OF MOUNT UNION, PENNSYLVANIA.

IMPROVEMENT IN MEAT-POUNDERS.

Specification forming part of Letters Patent No. 166,332, dated August 3, 1875; application filed June 2, 1875.

*To all whom it may concern:*

Be it known that we, JAMES T. BLACK and JOB TRUAX, of Mount Union, in the county of Huntingdon and State of Pennsylvania, have invented certain new and useful Improvements in Meat-Pounders; and we do hereby declare the following to be a full, clear, and exact description of the invention, such as will enable others skilled in the art to which it pertains to make and use it, reference being had to the accompanying drawings, which form part of this specification.

Our invention relates to an improvement in meat-pounders; and it consists in the combination and arrangement of parts that will be more fully described hereafter.

The accompanying drawings represent my invention.

$a$ represents a frame, in the sides of which is journaled the fluted roller $b$. Upon the axis of the roller $b$, at the outside of the frame $a$, is a ratchet, $c$, which is acted upon by the dog $d$, pivoted to a slide, $e$, that moves vertically in a slot, $f$, in the side of the frame $a$. At the inside of the frame, and perpendicular to the center of the roller $b$, are guides $g$, in which slide the ends of the bar $h$, the under side of said bar being convex and fluted, so as to fit to and encompass the upper part of the roller, upon which it is made to press by means of the spiral spring $i$, coiled around a stem, $l$, which stem arises from a block, $m$, that is inserted in the upper side of the bar $h$. A projection, $r$, from the block $m$ enters into a slot, $n$, cut transversely in a flat bar, $o$, the said bar being journaled in the sides of the frame $a$, and turned by the crank $p$ at the outside of the frame. The dog $d$ is made double-acting, so that the roller may be turned in either direction.

The operation is as follows: By turning the crank the projection $r$ in the slot $n$ is lifted up, and with it the bar $h$, which bar, in its rise, pushes the slide $e$ upward, and causes the dog $d$ to act upon the ratchet $c$, which partly turns the roller $b$. The stem $l$, around which the spring is coiled during this part of the operation, passes upward through an opening in the upper part of the frame, the spring becoming compressed between the block $m$ and the frame. Continuing to turn the crank, the projection $r$ slips out of the slot $n$, and, after passing over the outer edge of the bar, at which point the greatest compression of the spring occurs, suddenly re-enters the slot from the opposite side, and being free to act, the spring expands, and with its greatest force drives the bar $h$ downward against the roller $b$, and crushes or pounds the meat which is placed on top of the roller.

Having thus described our invention, we claim—

1. The combination of the fluted roller $b$, ratchet $c$, dog $d$, bar $h$, and slide $e$, substantially as described.

2. The combination of the fluted roller $b$, bar $h$, ratchet $c$, dog $d$, projection $r$, stem $l$, spring $i$, flat bar $o$, slides $e$, and crank $p$, the parts being arranged for operation substantially as shown and described.

3. The flat bar $o$, in combination with the crank $p$, projection $r$, block $m$, stem $l$, spring $i$, and bar $h$, substantially as specified.

In testimony that we claim the foregoing, we have hereunto set our hands this 24th day of May, 1875.

JAMES THOMPSON BLACK.
JOB TRUAX.

Witnesses:
 A. S. HARRISON,
 FRANK H. HARRISON.